United States Patent [19]

Terahara

[11] 4,251,957
[45] Feb. 24, 1981

[54] WORKPIECE TRANSFER APPARATUS FOR A PLURALITY OF MACHINE TOOLS

[75] Inventor: Gorou Terahara, Kariya, Japan

[73] Assignee: Toyoda-Koki Kabushiki-Kaisha, Kariya, Japan

[21] Appl. No.: 962,763

[22] Filed: Nov. 21, 1978

[30] Foreign Application Priority Data

Nov. 24, 1977 [JP] Japan .................. 52/141196

[51] Int. Cl.³ ............................ B24B 47/20
[52] U.S. Cl. ................. 51/215 CP; 414/225
[58] Field of Search ............... 29/33 P, S63, S64; 51/215 CP, 215 H; 212/128; 414/222, 225, 728; 409/158

[56] References Cited

U.S. PATENT DOCUMENTS

| | | | |
|---|---|---|---|
| 2,748,544 | 6/1956 | Narel | 51/215 H X |
| 3,204,782 | 9/1965 | Kendall | 51/215 CP X |
| 3,215,285 | 11/1965 | Happel | 51/215 CP X |
| 3,796,327 | 3/1974 | Meyer | 414/222 |
| 3,952,388 | 4/1976 | Hasegawa | 29/33 P |

Primary Examiner—Gary L. Smith
Attorney, Agent, or Firm—Oblon, Fisher, Spivak, McClelland & Maier

[57] ABSTRACT

A workpiece transfer apparatus is provided wherein an overhead transfer rail is arranged along and over a line of machine tools performing the same machining function, for guiding a plurality of pairs of workpiece carriers associated respectively with the machine tools. Each pair of the workpiece carriers are movable for respectively performing the loading of a workpiece into and the unloading of the same from an associated one of the machine tools. One of each pair of the workpiece carriers is also movable for transferring a workpiece from a support station disposed before the associated one of the machine tools directly to another support station disposed behind the associated one of the machine tools so that the same is bypassed by any workpiece to be machined in a succeeding one of the machine tools or having been machined in a preceding one of the machine tools.

6 Claims, 9 Drawing Figures

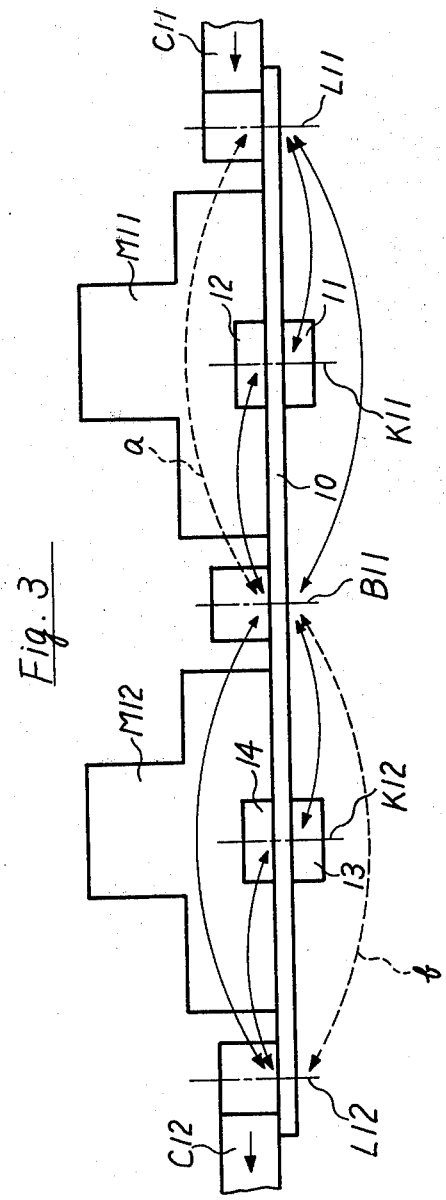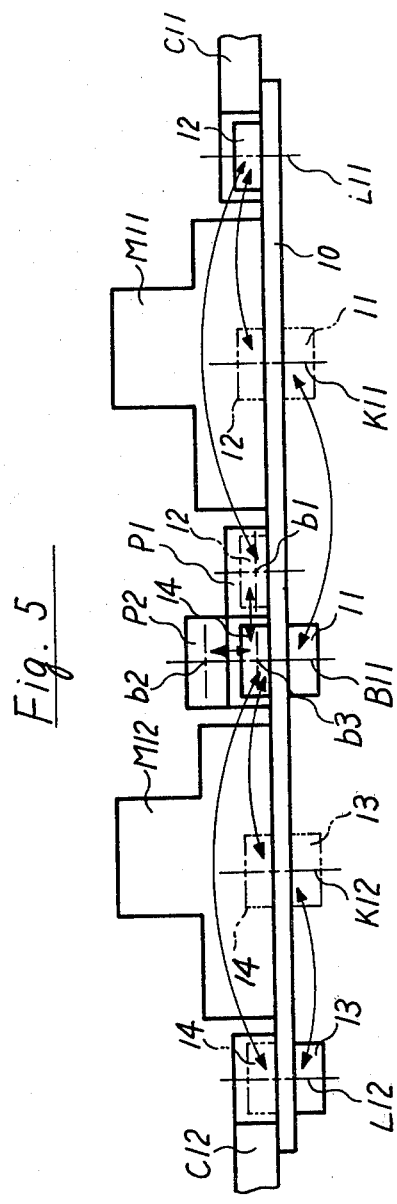

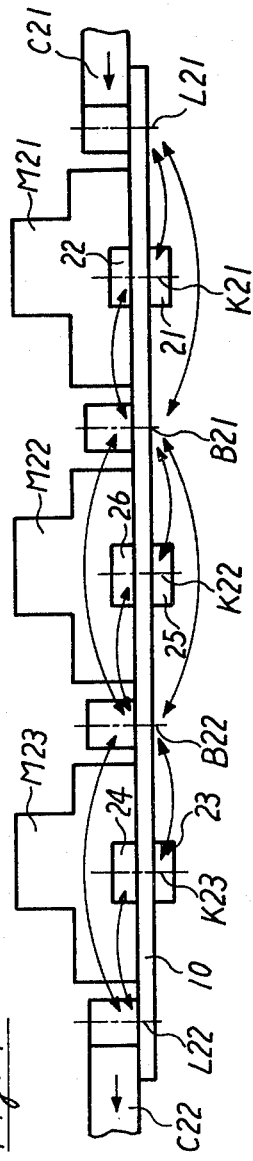
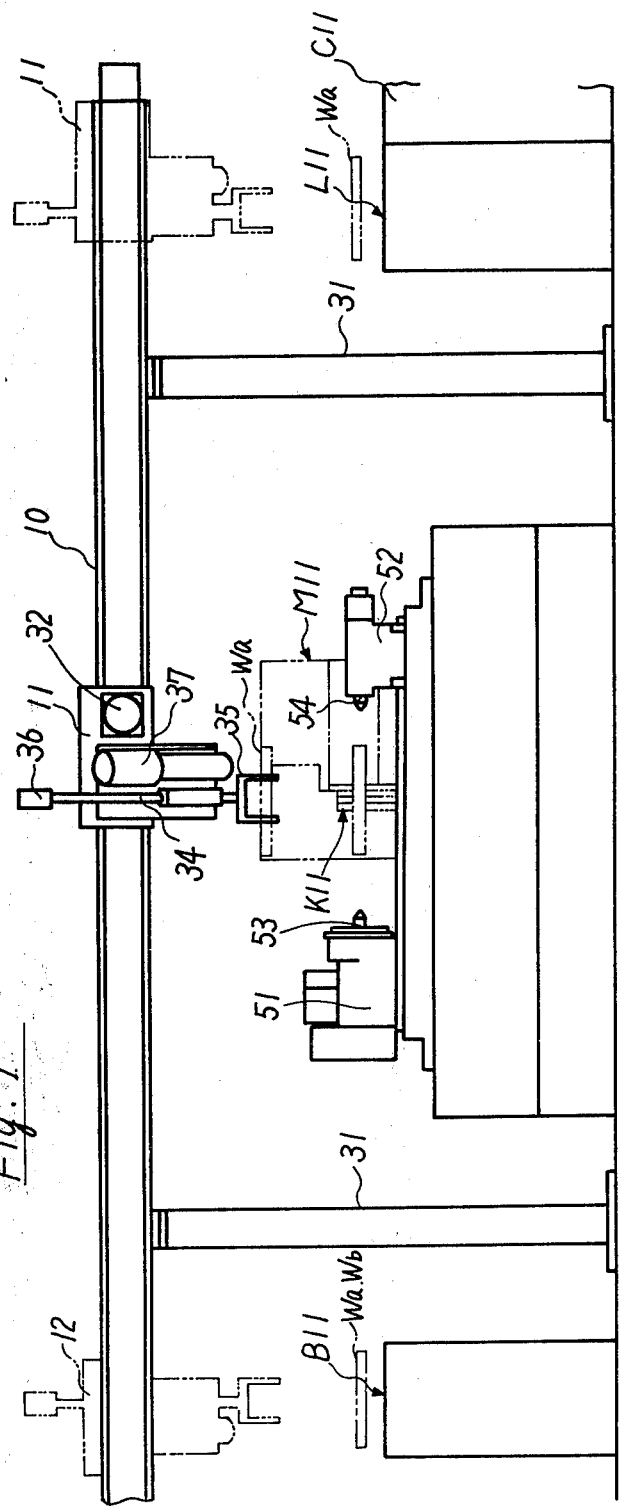
Fig. 4
Fig. 7

WORKPIECE TRANSFER APPARATUS FOR A PLURALITY OF MACHINE TOOLS

BACKGROUND OF THE INVENTION

1. Field of the Invention

The present invention relates to a workpiece transfer apparatus of an independent type which rationally performs the loading of an unfinished workpiece onto and the unloading of a finished workpiece from each of a plurality of machine tools performing the same machining function.

2. Description of the Prior Art

In a prior workpiece transfer apparatus of the aforementioned type, as shown in FIG. 1, there are disposed in parallel loading and unloading conveyors C1 and C2, along which a plurality (e.g. two) of machine tools M1 and M2 performing the same machining function are disposed, and further, a pair of manipulator carriers 1 and 2 are guided for travelling along an over-head transfer rail 3 extended between a machining station of each of the machine tools M1, M2 and the loading and unloading converyors C1, C2. However, such construction of the transfer apparatus leaves a problem to be solved in that a plurality of workpieces each awaiting a successive machining operation are stocked in that portion of the loading conveyor C1 which extends between the machine tools, thus increasing the number of undesirable in-line stock workpieces. Such construction of the transfer apparatus, moreover, makes it difficult for an operator to monitor the machining operation that each machine tool is performing, since except by turning around the corner of either of the machine tools as indicated by the broken line, he is not able to come from the front of one of the machine tools to the front of the other machine tool, and vice versa. Further, the conveyors C1 and C2 provide obstacles on the passing way of the operator. Although bridges crossing over the conveyors C1 and C2 are installed in places, the provision of the bridges does not bring about a perfect solution in obviating such restraint on the operator's passing.

Another prior transfer apparatus has also been known, wherein as shown in FIG. 2, a pair of machine tools performing the same machining function are disposed respectively at both sides of serially arranged loading and unloading conveyors C1 and C2, and wherein a pair of manipulator carriers 1 and 2 are guided for travelling along an overhead transfer rail 3 extended transversely of the conveyors C1, C2. In this transfer apparatus, workpieces that are stocked on the loading conveyor C1 for machining on either of the machine tools are advantageously decreased in number. However, the conveyors obstruct the way of an operator from one of the machine tools to the other machine tool, and this disadvantageously makes it difficult for the operator to monitor machining operations of both of the machine tools as well as to quickly approach the same.

SUMMARY OF THE INVENTION

Accordingly, it is a primary object of the present invention to provide an improved workpiece transfer apparatus which allows an operator to easily and quickly approach each of machining stations provided respectively in a plurality of machine tools performing the same machining function, for monitoring of machining operations or for adjustment or repair of any of the machine tools.

Another object of the present invention is to provide an improved workpiece transfer apparatus wherein in-line stock workpieces awaited between two adjacent machine tools are decreased in number thus making production control easy.

A further object of the present invention is to provide an improved workpiece transfer apparatus of the character set forth above wherein a plurality of machine tools performing the same machining function can be disposed along a transfer way of workpieces by enabling each pair of workpiece carriers to bypass an associated one of the machine tools so that unfinished workpieces are distributed not only to the associated machine tool, but also to a succeeding machine tool.

Briefly, according to the present invention, there is provided a workpiece transfer apparatus which comprises an overhead transfer rail extended along and over a line of a plurality of machine tools performing the same machining function, a plurality of support stations disposed along and under the transfer rail and alternately with the machine tools, the number of the support stations being larger by one than that of the machine tools so that a preceding support station and a succeeding support station are disposed respectively before and behind each of the machine tools, a plurality of pairs of workpiece carriers associated respectively with the machine tools and guided on the transfer rail, and a manipulator mounted on each of the workpiece carriers and vertically movable for loading a workpiece onto and unloading the same from any of the support stations and machining stations provided respectively in the machine tools. Each pair of the workpiece carriers comprises a first workpiece carrier movable between the machining station of an associated one of the machine tools and the preceding support station disposed before the same for transferring the workpiece to be machined from the preceding support station to the machining station and a second workpiece carrier movable between the machining station and the succeeding support station disposed behind the associated one of the machine tools for transferring the workpiece from the machining station to the succeeding support station after machining by the associated one of the machine tools. Further, one of the first and second workpiece carriers is movable also between the preceding and succeeding support stations for transferring a workpiece from the preceding support station directly to the succeeding support station by bypassing the machining station.

In the transfer apparatus according to the present invention, the plurality of machine tools performing the same machining function are serially arranged along and under the overhead transfer rail which guides the plurality of pairs of workpiece carriers above the height of an operator, and this provides the operator with a shorter way from one to another of the machine tools and allows him to easily and quickly approach any of the machine tools for monitoring of machining operations. Since the passing of the operator is not obstructed by the transfer apparatus, the working property can be greatly improved thus making easy the performance of maintenance service, adjustment and repair of any machine tool. Further, since no more than one workpiece is awaiting between two adjacent machine tools, the in-line stock workpieces are decreased in number with the result of heightening productivity, so that the transfer apparatus is of great advantage to production control.

BRIEF DESCRIPTION OF THE DRAWINGS

Various other objects, features and attendant advantages of the present invention will readily be appreciated as the same becomes better understood by reference to the following detailed description of preferred embodiments when considered in connection with the accompanying drawings, wherein like reference numerals designate like or corresponding parts throughout the several views, and in which:

FIG. 3 is a schematic view illustrative of a first embodiment of a workpiece transfer apparatus for machine tools according to the present invention;

FIG. 4 is a schematic view illustrative of a second embodiment of the apparatus according to the present invention;

FIG. 5 is a schematic view illustrative of a third embodiment of the apparatus according to the present invention;

FIG. 7 is a front elevation view of a part of the apparatus shown in FIG. 3;

DETAILED DESCRIPTION OF PREFERRED EMBODIMENTS

Figure 8:
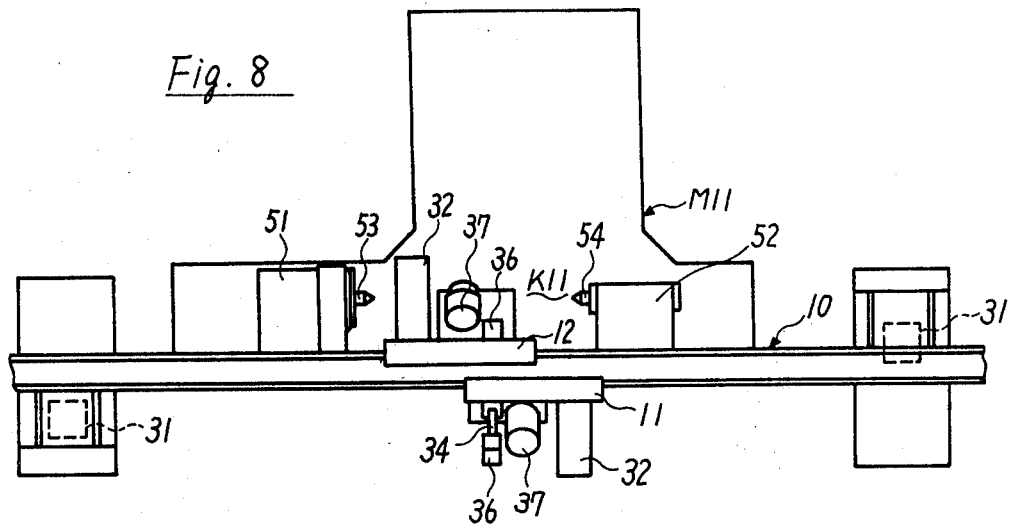
FIG. 8 is a plan view of the apparatus shown in FIG. 7.
Figure 9:
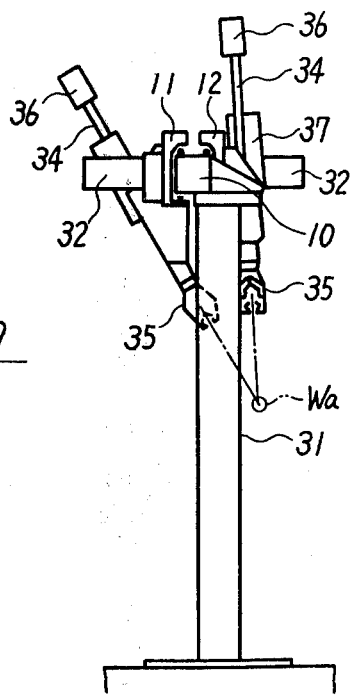
FIG. 9 is a side elevation view of the apparatus shown in FIG. 7.

Referring now to FIG. 3, two machine tools such as grinding machines constituting a certain machining step for performing the same machining function are provided respectively with machining stations K11 and K12. A loading conveyor C11 is connected to a preceding machining step, not shown, and a loading station L11 is disposed at an exit of the loading conveyor C11. An unloading conveyor C12 is connected to a succeeding machining step, not shown, and an unloading station L12 is disposed at an entrance of the unloading conveyor C12. An idle station B11 is disposed between the machine tools M11 and M12. An overhead straight transfer rail 10 is extended over and between the loading station L11 and the unloading station L12, and the machining stations K11, K12 and the idle station B11 are disposed along and under the transfer rail 10. Guided on the transfer rail 10 are two pairs of individually travellable carriers 11-14, on each of which an electric motor 32 is mounted as shown in FIGS. 7-9. The electric motor 32 operates to travel the associated carrier leftward and rightward by driving a pinion gear which is in meshing engagement with a rack bar (both not shown) fixed on and along the side of the transfer rail 10, and is responsive to signals from limit switches, not shown, which are actuatable respectively by dogs, not shown, disposed at predetermined positions, so as to decelerate and terminate the travelling of the associated carrier. Further, on each of the carriers 11-14, a manipulator arm 34 is guided for vertical movement and is provided at a lowermost end thereof with an actuatable gripper 35 and at an uppermost end thereof with a fluid actuator 36 for effecting open and closing actions of the gripper 35. An electric motor 37 for vertically moving the manipulator arm 34 is mounted also on each of the carriers 11-14 and is in driving connection to a pinion gear which is engaged with a rack (both not shown) formed on the manipulator arm 34. As best shown in FIG. 9, the manipulator arms 34 guided respectively on each pair of the carriers, for example, 11 and 12 are arranged with respective axes which make an acute angle so as to intersect with each other at a position on extension lines thereof, so that each of manipulator arms 34, 34 is able to load a cylindrical workpiece onto and unload the same from the position, namely a workpiece supporting position on each of the stations L11, K11, K12 and L12. As apparent from FIGS. 8 and 9, each of the machining stations K11 and K12 is provided with a headstock 51 and a foot stock 52, whose centers 53 and 54 cooperate to rotatably support any workpiece.

The carriers 11 and 13 guided on one side of the transfer rail 10 serve the transferring of unfinished workpieces Wa, while the carriers 12 and 14 guided on the other side of the transfer rail 10 serve the transferring of finished workpieces Wb. The carrier 11 loads any unfinished workpiece Wa that it receives at the loading station L11, alternately onto the machining station K11 or onto the idle station B11, and the carrier 13 loads any unfinished workpiece Wa that it receives at the idle station B11, to the machining station K12. The carrier 12 loads any finished workpiece Wb that it unloads from the machining station K11, onto the idle station B11, and the carrier 14 loads any finished workpiece Wb that it receives either at the idle station B11 or at the machining station K12 onto the unloading station L12. As easily understood, the carrier 11 that serves the loading of any unfinished workpiece Wa onto the machining station K11 is also used to transfer any unfinished workpiece Wa from the loading station L11 directly to the idle station B11 by bypassing the machining station K11, and thus, the unfinished workpiece Wa is supplied also to the machine tool M12 which performs the same machining operation as does the machine tool M11. Further, the carrier 14 that serves the unloading of any finished workpiece Wb from the machining station K12 is also used to transfer any workpiece Wb machined by the preceding machine tool M11 from the idle station B11 directly to the unloading station L12 by bypassing the machining station K12, and thus, the workpieces machined by the machine tool M11 are transferred also to the succeeding machining step. Accordingly, it can be reduced to practice to serially dispose two machine tools that perform the same machining function, along the transfer rail 10.

Where two machine tools are disposed, the task of transferring unfinished workpieces Wa by bypassing the machining station K11 may be assigned not to the carrier 11, but to the carrier 12 so as to allow the unfinished workpieces Wa to be transferred as indicated by the broken line (a) in FIG. 3. Further, the task of transferring finished workpieces Wb by bypassing the machining station K12 may be assigned not to the carrier 14, but to the carrier 13 so as to allow the finished workpieces Wb to be transferred as indicated by the broken line (b) in FIG. 3. It is to be realized that it belongs to the choice of design which one of each pair of the workpiece carriers 11, 12 (13, 14) associated with the machine tool M11 (M12) serves bypassing the machining station K11 (K12) of the associated machine tool.

The workpiece transfer apparatus as constructed above is not limited to that wherein two machine tools are disposed in the same machining step. The number of machine tools that can be disposed in the same machining step is not limited in principle, but is practically limited by various factors such as the ratio of a loading and unloading cycle time of each carrier to a machining cycle time of each machine tool, a workpiece waiting time tolerable for each machine tool, etc.. Where three machine tools are disposed in the same machining step as shown in FIG. 4, two pairs of carriers 21–24 associated respectively with a first machine tool M21 and a last machine tool M23 are controlled to perform the same transfer operations as do the pairs of the carriers 11–14 in the case of two machine tools, respectively. However, the case of three machine tools differs from the case of two machine tools in the following respects. That is, a carrier 25 associated with a second machine tool M22 must serve the transferring of an unfinished workpiece Wa bypassing a machining station K22 as well as the loading of an unfinished workpiece Wa onto the machining station K22. A carrier 26 paired with the carrier 25 must serve the transferring of a finished workpiece Wb bypassing the machining station K22 as well as the unloading of a finished workpiece Wa from the machining station K22. It will therefore be understood that if the number of machine tools which are disposed between the first and last machine tools M21 and M23 increases, there may be provided in correspondence to every increased machine tool a pair of carriers which respectively perform the same transfer operations as do the pair of carriers 25, 26 shown in FIG. 4.

In the embodiment illustrated in FIG. 3, unfinished and finished workpieces Wa, Wb are alternately loaded onto the idle station B11, and in this connection, transfer cycles of the pair of carriers 13, 14 associated with the machine tool M12 must be controlled so as to enable any finished workpiece Wb to bypass the succeeding machining station K12. The discrimination of any finished workpiece Wb from any unfinished workpiece Wa may be carried out for such controlling of the transfer cycles. However, an alternative is possible and FIG. 5 shows means for achieving such controlling without discriminating any finished workpiece Wb from any unfinished workpiece Wa. Referring now to FIG. 5, two shiftable support rests P1 and P2 are provided at the idle station B11. The support rest P1 waits at its home position b1 until receiving an unfinished workpiece Wa loaded by the carrier 12 and then, shifts to an advanced position b3 so as to present the unfinished workpiece Wa under the carrier 14. The support rest P2 waits usually at its home position b2 and then, shifts to the advanced position b3 so as to receive a finished workpiece Wb from the carrier 11 and to present the finished workpiece Wb under the carrier 14.

More specifically, since an unfinished workpiece Wa has necessarily been carried on the support rest P1 when the same is at the advanced position b3, the carrier 14 is controlled to transfer the unfinished workpiece Wa to the machining station K12 after receiving the workpiece Wa from the support rest P1 at the position b3. Further, since a finished workpiece Wb has necessarily been carried on the support rest P2 when the same is at the advanced position b3, the carrier 14 is controlled to transfer the finished workpiece Wb to the unloading station L12 after receiving the workpiece Wb from the support rest P2 at the position b3. By providing in the idle station B11 the shiftable support rests P1 and P2 which are used exclusively respectively for any unfinished workpiece Wa and any finished workpiece Wb in the foregoing manner, the transferring of each of the unfinished and finished workpieces Wa, Wb from a preceding carrier to a succeeding carrier is smoothly performed, whereby any unfinished and finished workpieces Wa, Wb can be prevented from interfering with each other at the same idle station.

Figure 1:
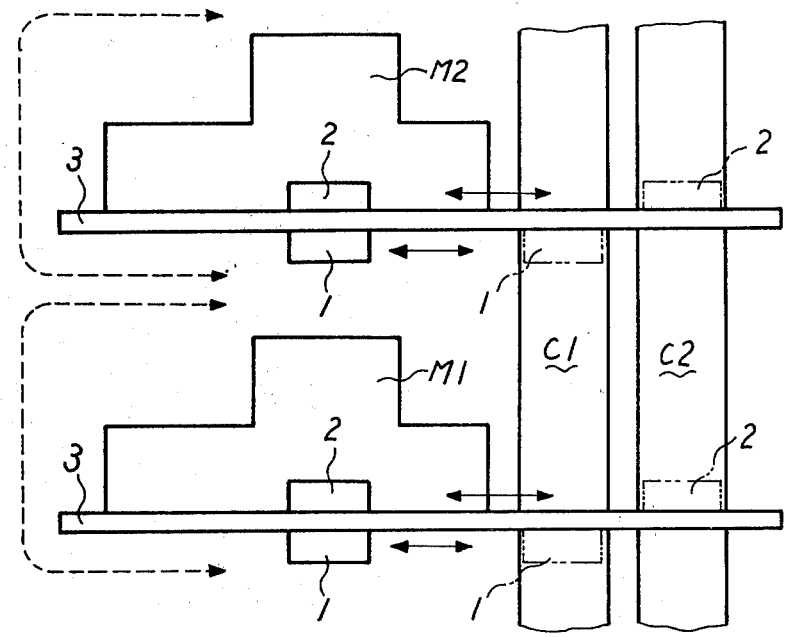
FIG. 1 is a schematic view illustrative of a prior workpiece transfer apparatus for machine tools.
Figure 2:
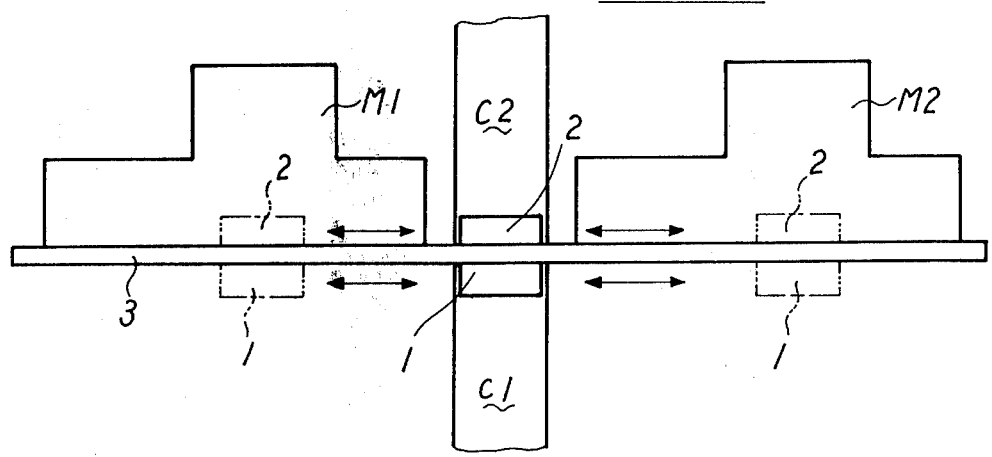
FIG. 2 is a schematic view illustrative of another prior workpiece transfer apparatus for machine tools.
Figure 6:
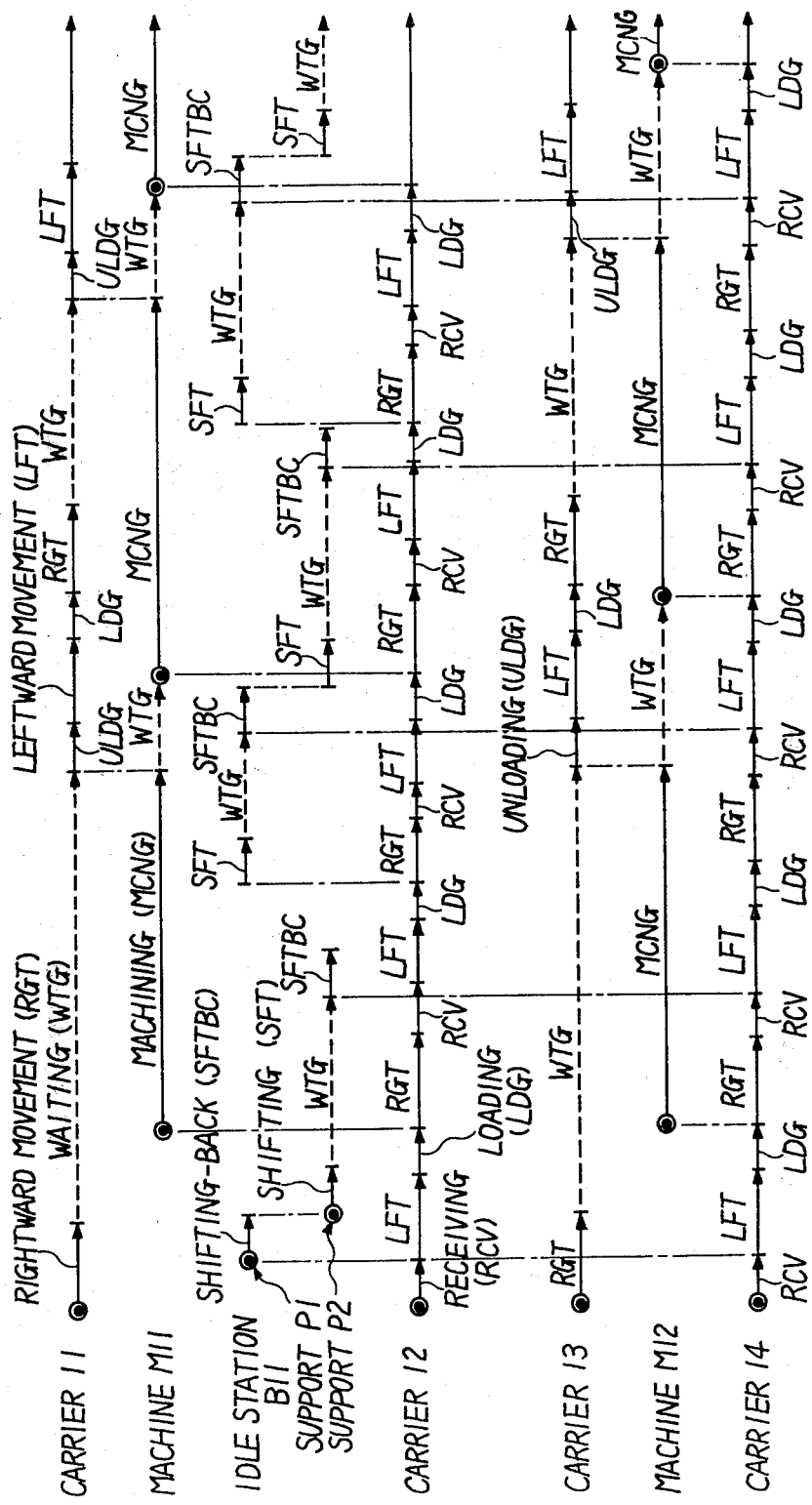
FIG. 6 is a cycle diagram explaining the operation of the apparatus shown in FIG. 5.

The operation of the transfer apparatus as exemplified in FIG. 5 will be described hereinafter with reference to a cycle diagram shown in FIG. 6. Now, let it be assumed that each of the carriers 11—14 initiates its operation from such a position as indicated by the solid line in FIG. 5 and that the support rest P1 in the idle station B11 has been shifted to the advanced position b3, carrying an unfinished workpiece Wa. The carriers 11 and 13 are moved rightward to the machining station K11 and K12 and are awaited over the same until the machining operations of the machine tools M11 and M12 are completed, respectively. The carriers 12 and 14 receive unfinished workpieces Wa at the loading station L11 and the idle station B11, move leftward to the machining stations K11 and K12 and load the unfinished workpieces Wa onto the machining stations K11 and K12 by lowering the manipulator arms 34, respectively. The machine tools M11 and M12 initiate machining operations upon completions of loading the unfinished workpieces Wa, Wa onto the machining stations K11 and K12, respectively. Subsequently, the carriers 12 and 14 are moved rightward and are stopped over the loading station L11 and the idle station B11 so as to receive therefrom an unfinished workpiece Wa and a finished workpiece Wb, respectively. It is to be noted herein that when the carrier 14 completes receiving the unfinished workpiece Wa from the support rest P1, the same is immediately shifted back to the home position b1, and that the support rest P2 carrying a finished workpiece Wb is then shifted to the advanced position b3. Accordingly, when the travelling of the carrier 14 from the machining station K12 to the idle station B11 is completed, the carrier 14 is able to immediately remove the finished workpiece Wb from the support rest P2 since the same has already been shifted to the advanced position b3.

The support rest P2 is shifted back to the home position b2 after the removal by the carrier 14 of the finished workpiece Wb, and the carriers 12 and 14 are moved toward the left immediately after respectively receiving the workpieces Wa and Wb. The carrier 12 is stopped over the support rest P1 which has been shifted to the home position b1, and loads the unfinished workpiece Wa onto the support rest P1, which is then shifted to the advanced position b3. On the other hand, the carrier 14 is stopped over the unloading station L12 and loads thereonto the finished workpiece Wb. Thereafter, the carriers 12 and 14 are moved toward the right, receive unfinished workpieces Wa at the loading station L11 and the idle station B11 and then, are moved leftward to the machining stations K11 and K12, respectively. It is to be noted herein that when the carrier 14 is moved from the unloading station L12 to the idle station B11, the support rest P1 has been shifted to the advanced position b3, so that an unfinished workpiece is then received by the carrier 14, as described above. The support rest P1 is shifted back to the home position P1 after the removal of the unfinished workpiece Wa. Further, when the machine tools M11, M12 complete their machining cycles, finished workpieces Wb are respectively unloaded by the carriers 11 and 13 from the machining stations K11 and K12. Immediately after this, the carriers 12 and 14 reach the machining stations K11 and K12 and load the unfinished workpieces Wa onto the machining stations K11 and K12, respectively. The foregoing operations are repeated hereinafter.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States:

1. A workpiece transfer apparatus for loading and unloading a workpiece comprising:
   a plurality of serially disposed machine tools performing the same machining function and each defining a machining station;
   an overhead transfer rail along and over said machine tools;
   a plurality of support stations disposed along and under said transfer rail and alternately with said machine tools each for temporarily supporting a workpiece to be transferred to and from one of said machine tools, the number of said support stations being larger by one than that of said machine tools so that a preceding support station and a succeeding support station are disposed respectively before and behind each of said machine tools;
   a plurality of pairs of workpiece carriers associated respectively with said machine tools and guided on said transfer rail for transferring workpieces therealong, each pair of said workpiece carriers comprising
   a first workpiece carrier movable between a machining station provided in an associated one of said machine tools and said preceding support station disposed before said associated one of said machine tools for transferring a workpiece to be machined from said preceding support station to said machining station, and
   a second workpiece carrier movable between said machining station and said succeeding support station disposed behind said associated one of said machine tools for transferring said workpiece from said machining station to said succeeding support station after machining by said associated one of said machine tools, one of said first and second workpiece carriers being movable also between said preceding and succeeding support stations for transferring a workpiece from said preceding support station directly to said succeeding support station by bypassing said machining station; and
   a manipulator mounted on each of said workpiece carriers and vertically movable for loading said workpiece onto and unloading the same from any of said preceding and succeeding support stations and said machining station.

2. A workpiece transfer apparatus as set forth in claim 1, wherein:
   said plurality of said machine tools comprises a first machine tool, a last machine tool and at least one intermediate machine tool disposed therebetween; and
   a pair of said first and second workpiece carriers associated with said intermediate machine tool are individually movable between said preceding and succeeding support stations disposed respectively before and behind said intermediate machine tool, for respectively transferring a workpiece to be machined and a workpiece having been machined from said preceding support station directly to said succeeding support station by bypassing and machining station of said intermidiate machine tool.

3. A workpiece transfer apparatus as set forth in claim 1, wherein:
   said plurality of said machine tools comprises at least first and second machine tools;
   said plurality of said support stations comprises a first support station disposed before said first machine tool, a second support station disposed between said first and second machine tools and a third support station disposed behind said second machine tool; and
   at least said second support station comprises first and second support rests selectively shiftable from home positions thereof to an advanced position for respectively presenting a workpiece to be machined and a workpiece having been machined at said advanced position.

4. A workpiece transfer apparatus as set forth in claim 3, wherein:
   said first workpiece carrier associated with said second machine tool is controlled to move to said machining station of said second machine tool after receiving said workpiece from said first support rest and to said third support station after receiving said workpiece from said second support rest.

5. A workpiece transfer apparatus as set forth in claim 4, wherein:
   said first workpiece carrier associated with said first machine tool is movable for transferring said workpiece to be machined from said first support station selectively either to said machining station of said first machine tool or to said first support rest waiting at said home position thereof; and
   said second workpiece carrier associated with said first machine tool is movable for transferring said workpiece having been machined from said machining station of said first machine tool to said second support rest having been shifted to said advanced position.

6. A workpiece transfer apparatus as set forth in claim 2 or 5, wherein:
   said workpiece is a cylindrical workpiece capable of being center-carried;
   said machining station of each of said machine tools includes means for rotatably supporting said workpiece through a pair of centers; and
   said manipulator mounted on each of said workpiece carriers is adapted to present said workpiece into substantial axial alignment with said centers and to receive said workpiece being carried in substantial axial alignment with said centers.

* * * * *